Oct. 26, 1954
J. H. PYE
2,692,910
CONTRACT SALES MACHINE AND THE LIKE
Original Filed Jan. 30, 1951
7 Sheets-Sheet 1
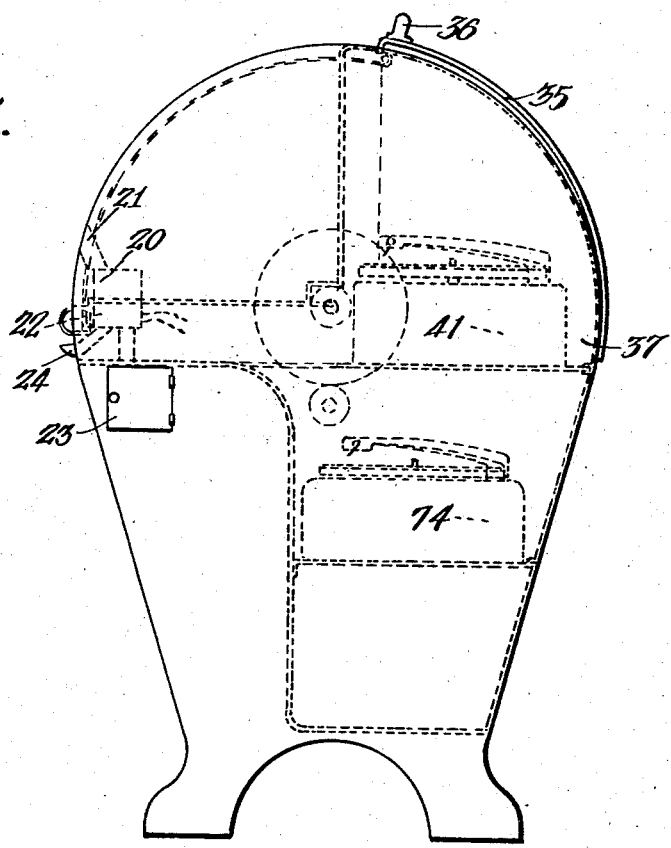
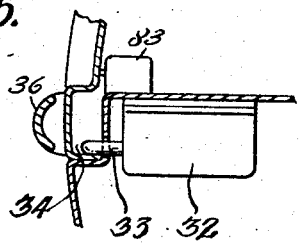
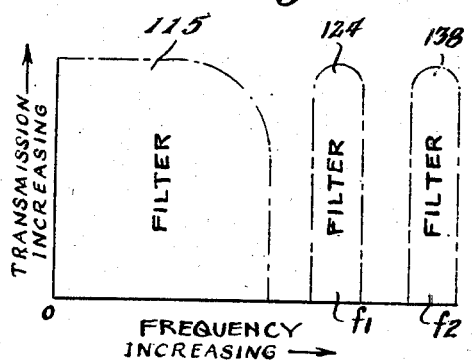
INVENTOR
James H. Pye.
BY
ATTORNEYS

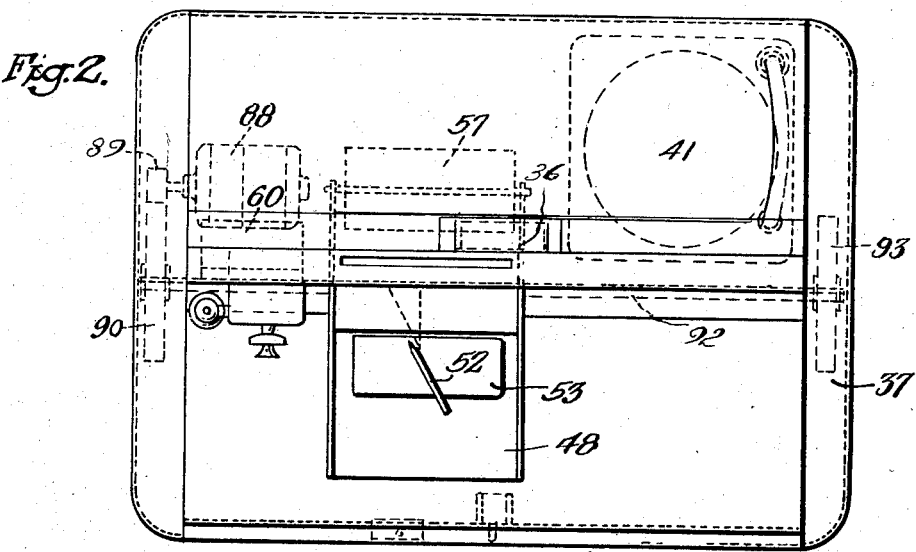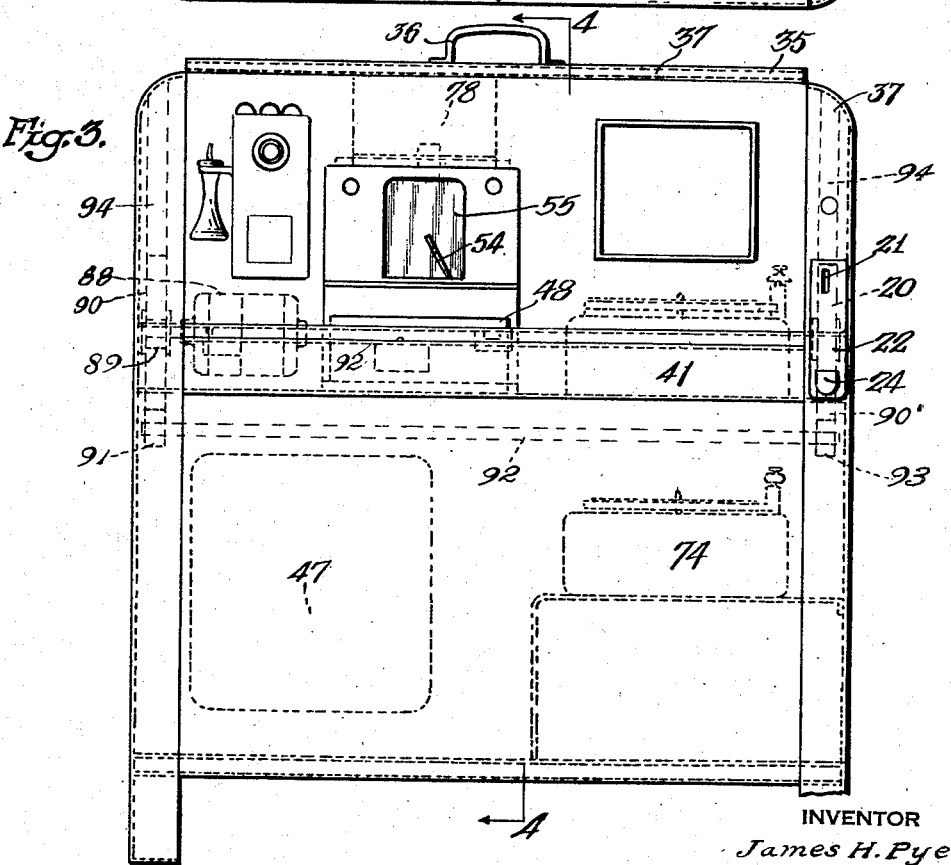

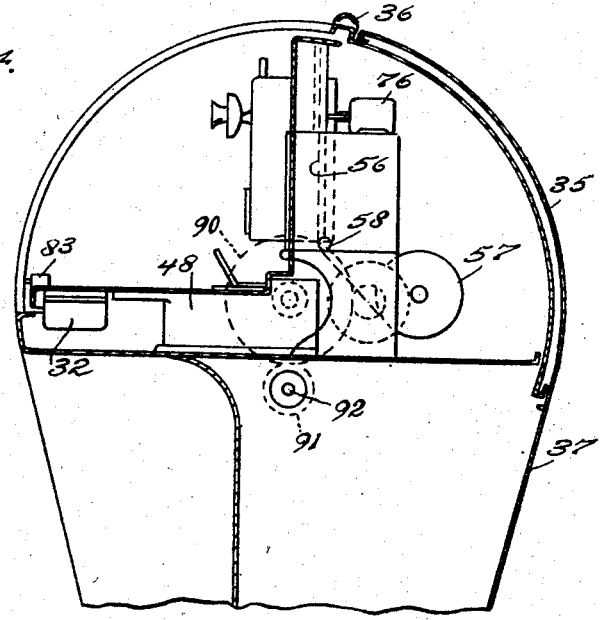
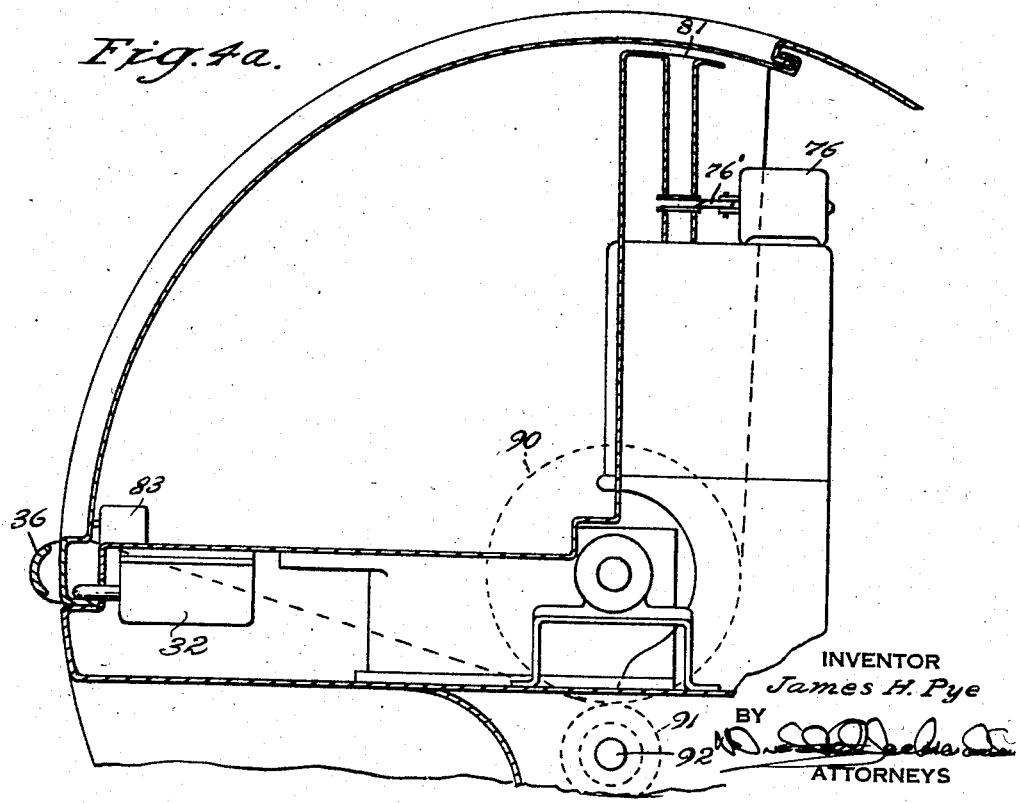

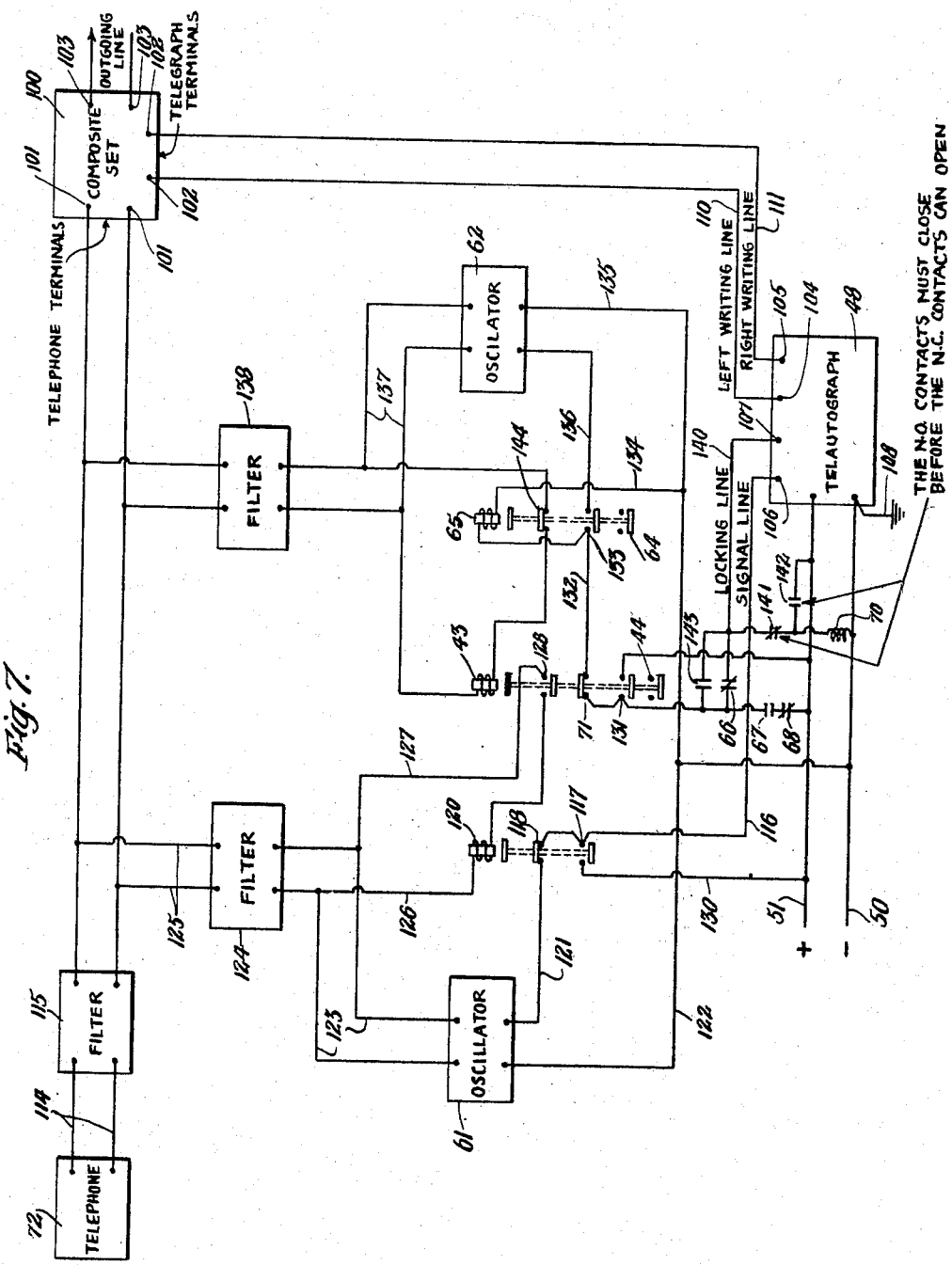

Oct. 26, 1954  J. H. PYE  2,692,910
CONTRACT SALES MACHINE AND THE LIKE
Original Filed Jan. 30, 1951  7 Sheets-Sheet 6
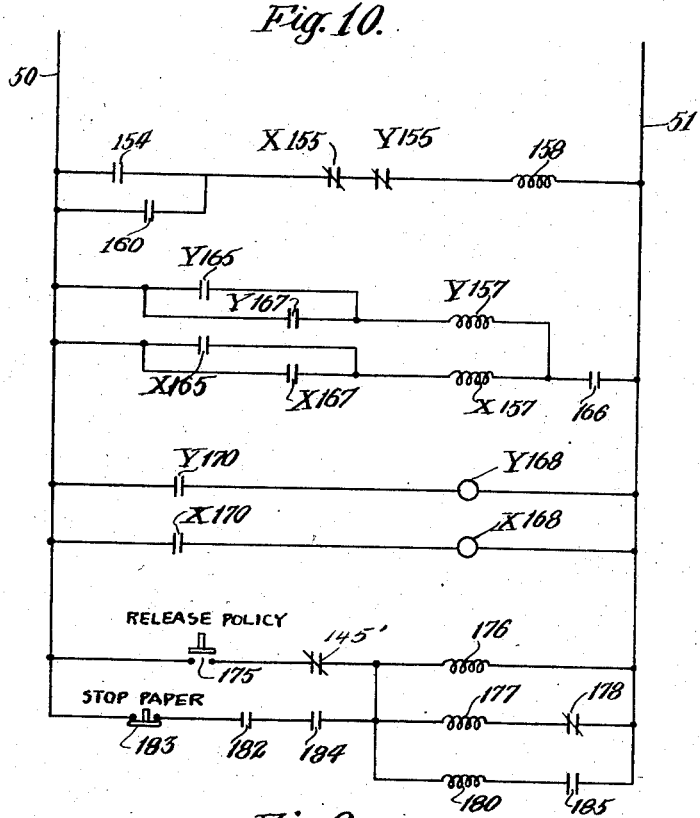
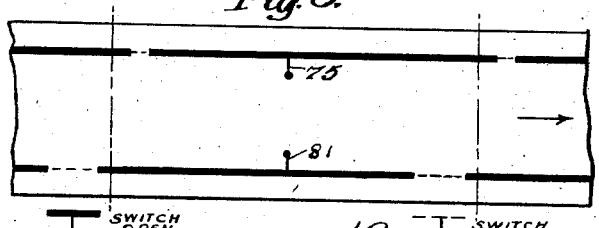
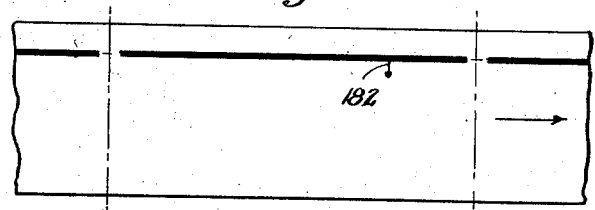
INVENTOR
James H. Pye.
BY
ATTORNEYS

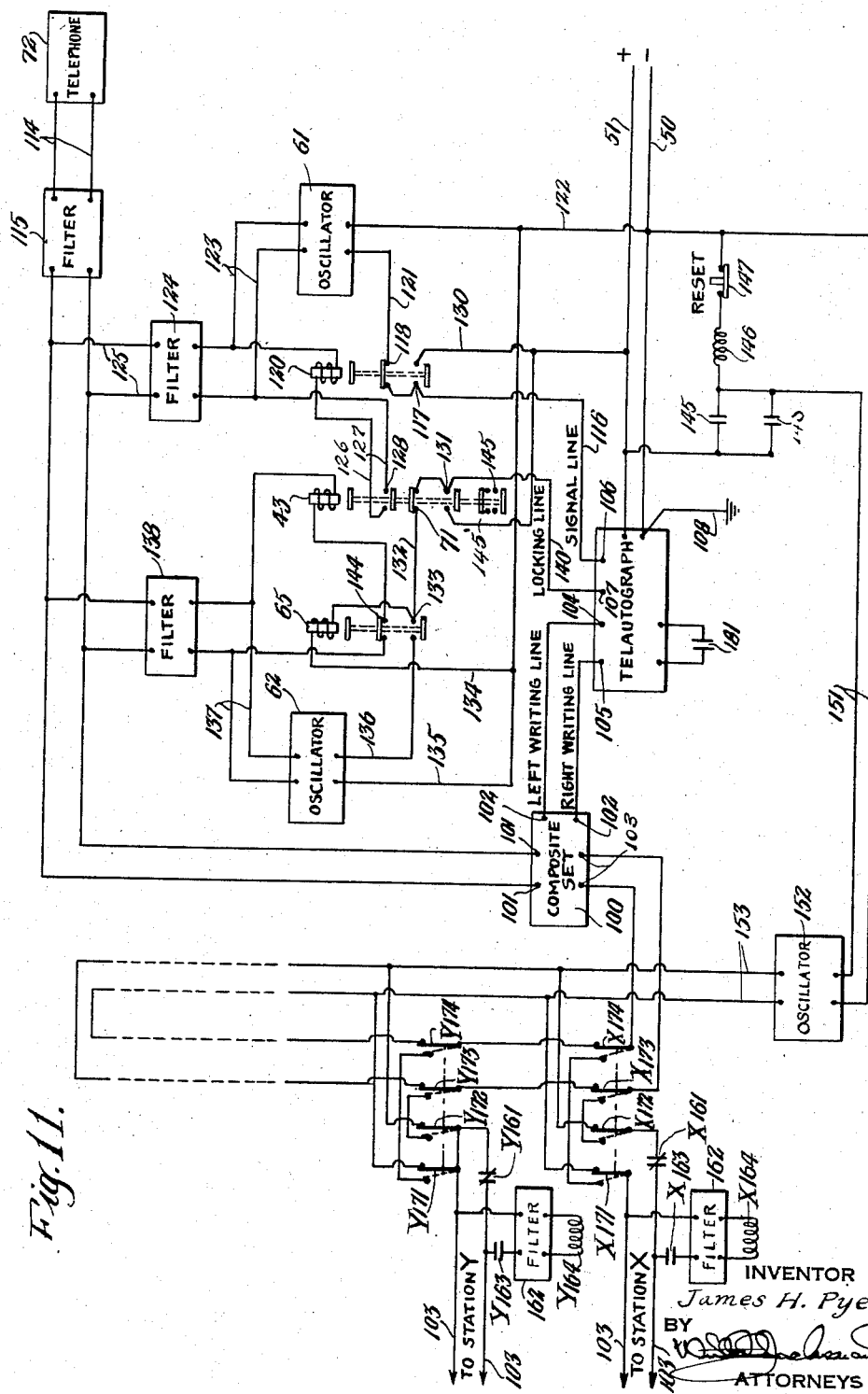

Patented Oct. 26, 1954

2,692,910

UNITED STATES PATENT OFFICE 2,692,910

CONTRACT SALES MACHINE AND THE LIKE

James H. Pye, Wynnewood, Pa.

Original application January 30, 1951, Serial No. 208,467. Divided and this application May 1, 1952, Serial No. 285,523

6 Claims. (Cl. 178—18)

The present invention relates to machines for vending insurance and other contracts.

The present application is a division of my copending application Serial No. 208,467, filed January 30, 1951, for Contract Sales Machine, the parent application retaining the claims on the composite telegraph and telephone communication circuit, and the present application including the claims on the teleautograph, the relating control circuit and the paper feed for the teleautograph.

A purpose of the invention is to provide a master station and a dispensing station, to connect the stations by a teleautograph system and to permit the completion of a contract of insurance, or the preparation of an offer for such a contract, by means of the teleautograph system.

A further purpose is to interconnect the teleautograph stations by means of composite sets and desirably to conduct telephonic communication through the same pair of wires.

A further purpose is to employ carrier currents generated by oscillators at the sending station and passing through filters at the receiving station to operate relays at a receiving station in order to actuate the signal and locking terminals of the teleautograph.

A further purpose is to employ an additional relay at the sending station to render the receiving relays at that station inoperative and preferably to actuate the additional relay from the locking terminal at the sending station.

A further purpose is to energize the teleautograph and desirably also the amplifiers at the sending station by a check controlled switch operating a relay.

A further purpose is to actuate a ready signal at the dispensing station in response to a relay which renders the receiving relays inoperative at that station.

A further purpose is to transmit the signature of an insurance company representative accepting a policy over a teleautograph to the dispensing station.

A further purpose is to energize a relay in a dispensing station and preferably at the same time energize a check receptor lock-out and a busy signal by a locking system when any other dispensing station is in operation.

A further purpose is to send out an original locking carrier wave from a dispensing station to a master station and at the master station thereby energize a system locking oscillator and switch all other dispensing stations except the one in use to locking connection with the system locking oscillator.

A further purpose is to energize a system lock-out relay at the master station by the original locking oscillator, by the system lock-out relay to energize the system locking oscillator, to energize an auxiliary filter control relay which connects auxiliary locking filters in each line and temporarily disconnects each line from the composite set of the master station, to energize an auxiliary filter locking signal relay beyond the auxiliary filter at the line which is in use, and thereby to energize a line switching relay which connects the particular line in use to the composite set and connects all other lines to the system locking oscillator.

A further purpose is to close a policy release switch, to energize a release relay and to energize a pair of forward and reset step relays which alternately deenergize one another, one of the step relays successively opening and closing step contacts in the teleautograph.

A further purpose is to control the closing of the door by paper limit switches operated by the contract as it is withdrawn.

A further purpose is to release an electric lock in response to a check controlled switch to permit opening the door of the machine.

Further purposes appear in the specification and in the claims.

In the drawings I have chosen to illustrate one only of the numerous embodiments in which my invention may appear, selecting the forms shown from the standpoints of convenience in illustration, satisfactory operation and clear demonstration of the principles involved.

Figure 1 is a diagrammatic end elevation of the contract vending machine of the invention.

Figure 2 is a top plan view of Figure 1.

Figure 3 is a front elevation of Figure 1 with the door open.

Figure 4 is a fragmentary section of Figure 3 on the line 4—4.

Figure 4a is a fragmentary enlargement of Figure 4.

Figure 5 is a further fragmentary enlargement of Figure 4 showing the door locked.

Figure 7 is a circuit diagram of the circuit connected with the teleautograph station oscillators and composite set at a dispensing station.

Figure 8 is a diagrammatic plan view of the paper limit switches at the dispensing station.

Figure 9 is a diagram showing the frequencies of the oscillators and the frequencies passed by the filters.

Figure 10 is a circuit diagram of the general circuit at the master station.

Figure 11 is a circuit diagram of the telautograph station oscillators and composite set at the master station.

Figure 12 is a diagrammatic plan view of the paper limit switches at the master station.

Figure 6:
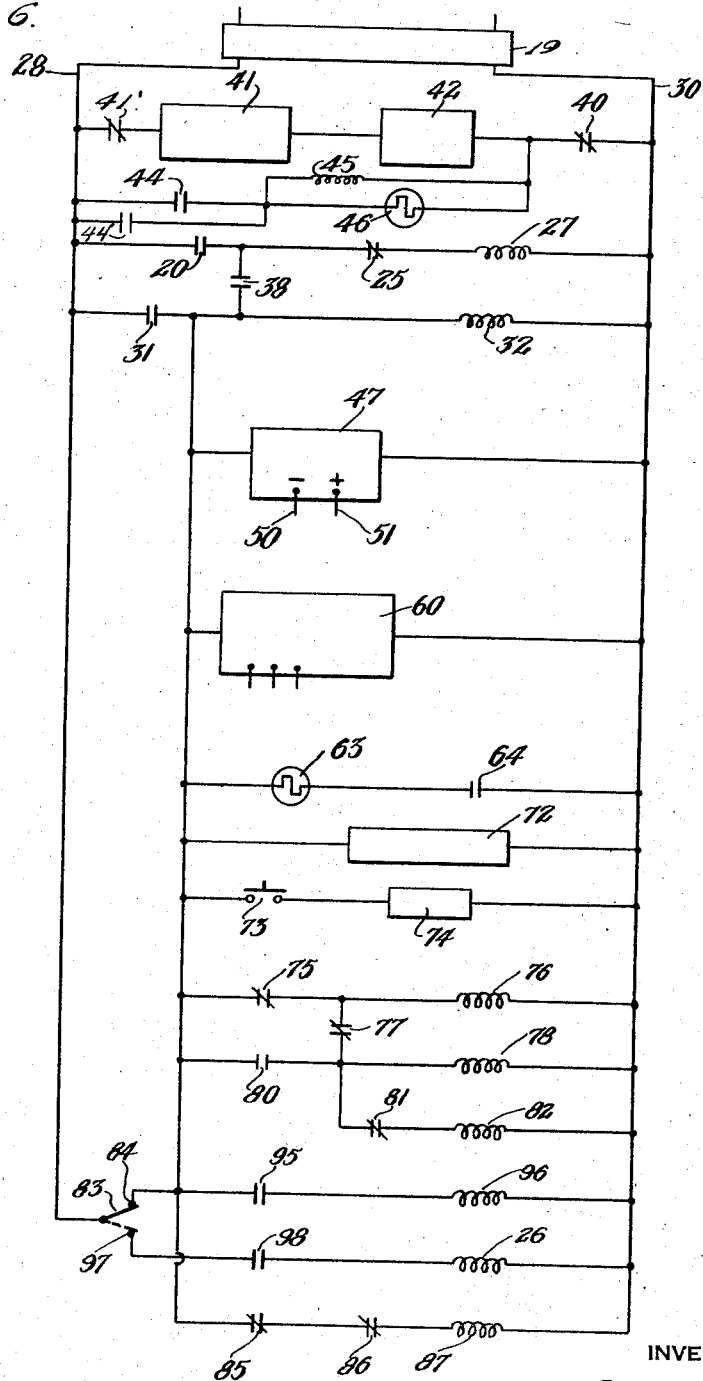
Figure 6 is a circuit diagram illustrating the general electrical circuit of the machine at a dispensing station.

Describing in illustration but not in limitation and referring to the drawings:

In the prior art efforts to sell insurance by machine have met with limited success because of the complexity of the equipment and the inability of the customer to obtain requested information. The present invention relates to a vending machine for contracts, especially of insurance, but including other legal documents and is designed to overcome the difficulties of existing equipment.

The sales cost of small insurance policies has been so high that many brokers and agents have been unwilling to handle such policies, in addition to which the minimum premiums charged by the insurance companies very materially increase the cost to the purchaser. The present invention is concerned with a device which will make the sale of very small policies economically feasible.

The machine can be located in public or semi-public places such as railway stations, department stores, public buildings, office buildings or the like. One master or headquarters station may control ten or more dispensing stations within a radius of five miles or more, and using only one operator. A complete record of every transaction is kept at the master station. The customer may pay part or all of the consideration by depositing the necessary coins in the telephone coin box at the machine. If desired, the machine also may operate by allowing the customer to make a payment by a bill of exchange (bank check) or cash paid to the master station.

One of the distinctive features is that the purchaser fills in the policy himself and the insurance company's representative signs the form and/or policy. If desired the operator at the master station can fill in the policy and then sign it. At the same time the purchaser fills in the duplicate form by telautograph at the master station. The purchaser may, if he wishes, talk to the master station by telephone, desirably operating over the same pair of wires as those used by the telautograph. The telephone system may be of the coin box type rather than the talking box type. Questions can thus be asked and the customer may satisfy himself as to any question or doubt.

At the completion of the transaction the insurance company representative may sign the insurance policy on the telautograph thus transmitting his signature to the policy at the dispensing station.

Prior to completion of the transaction the insurance company representative can review each policy and reject any offer not desired.

Due to the authorization to insurance companies in many states to insure multiple lines, that is, issue a single policy covering multiple perils on a single property, the insurance company representative can issue a single policy on several perils.

The transaction, as far as possible, is a single complete unit, resulting in great saving of labor and time to the insurance company, the company's representative and corresponding reductions in cost to the purchaser. The customer can also purchase the policy with a minimum of effort.

Where it is not desired to use the check or coin deposit feature, the policy may be paid for by sending a bill of exchange (bank check) to the headquarters. A suitable bank check form may appear on the policy if desired.

To operate a dispensing station, an electric switch 20 is closed, suitably of the instantaneous contact type. Where the consideration is to be paid for by a bill of exchange, the switch may be any suitably manually operated switch, but normally it will be a check (coin) operated switch of any standard type. In the coin slot 21 (Figure 1) is a suitable slug rejecting coin receiving device 22 as well known, having a coin receiver 23 and a coin return chute 24. It will be evident that the coin switch and associated mechanism may be of any standard commercial form.

A program timer 19 is desirably connected between a suitable power source (suitably 110 volts direct current) and the power leads of the device (Figure 6) to turn off the device at any time (late night, for instance) when the operation is not desired. The program timer, besides the switching which turns on and off the main power source, has advertising cut-off contacts $19^1$ and coin lock-out contacts $19^2$ as later explained.

The check operated switch 20 is in series (Figure 6) with normally closed contacts $26^1$ of a release relay 26, and with a cycle starting relay 27 across terminals 28 and 30 of the source energized through program control 19. Direct current is preferred. If alternating current is used, corresponding adjustment may be made by introducing rectifiers for the telautograph and oscillator power supplies. The cycle starting relay 27 has a first set of normally open contacts $27^1$ in series across the line with a latching solenoid 32 (Figures 5 and 6) acting on a latching plunger 33 which is spring urged toward latching position. The latching plunger 33 engages under a latch 34 of an arcuate rotating door 35 covering the front upper segment of the machine at the dispensing station when in closed position and provided with a handle 36. The door rotates in a suitable trunnion within the housing 37 of the dispensing machine.

Cycle starting relay 27 also carries contacts $27^2$ which are in series across the line between check controlled switch 20 and latching solenoid 32 in parallel with normally closed contacts $27^2$ and cycle starting relay 27, normally open contacts $27^2$ holding the cycle starting relay in operation notwithstanding that check controlled switch 20 remains closed only instantaneously. Cycle starting relay 27 is provided with normally closed contacts $27^3$ which are in series across the line with an advertising record player 41 (Figures 1, 2, 3 and 6) and an electric timer 42 which times the operation of the advertising record player. Contacts $19^1$ of program timer 19 are closed whenever the circuit is energized by the program timer. When cycle starting relay 27 picks up and normally closed contacts $27^3$ open, the advertising record player and timer cease to function as long as the customer is operating the dispensing station. As later explained, an instruction record player is available at the dispensing station to tell the customer what to do.

If any unit of the system is in operation with the master station, lock-out receiving relay 43 (Figure 7) of each other station will pick up, as later explained, due to the locking carrier wave received at each other station, and normally open contacts 43¹ (Figures 6 and 7) of lock-out receiving relay 43 are closed. At this time, parallel contacts 19² of program timer 19 are open, contacts 19² being closed only when it is not desired to permit operation of the station, although the advertising record player 41 may be operating. This energizes check (coin) lock-out solenoid 45 at the locked out dispensing stations and the armature of the solenoid closes the connection from the coin slot 21 into the coin receiver 23 and diverts the coin into the coin return slot 24. The closing of normally open contacts 43¹ also energizes busy signal 46 at each locked out station, suitably operating a buzzer or lamp to warn the prospective user that the machine is busy and will not accept his coin.

If the system is not busy, the insertion of a check (coin) will energize cycle starting relay 27 as above set forth. Contacts 27¹ and 27² reduce the surge of current passing through the coin operated contacts.

As soon as cycle starting relay 27 is energized a number of effects occur due to a number of parallel circuits between the normally open contacts 27¹ and the opposite side of the line. One of these parallel circuits includes the direct current generator 47 for the telautograph station 48. The generator has a negative power connection 50 and a positive power connection 51 which supply power to the dispensing station telautograph shown in Figure 7. As long as all stations are reversed together, the polarity of terminals 50 and 51 could be reversed so that connection 50 is positive and connection 51 is negative. The telautograph is desirably of conventional character, as for example that shown in Van Nostrand U. S. Patent No. 1,623,220, granted April 5, 1927, for Telautograph System.

The telautograph is provided with a special pencil or stylus 52 (Figure 2) and rides on a steel plate or bed 53 which may, if desired, have a master form of the policy printed thereon. By so doing, as well known, a special ink pen 54 (Figure 3) inside the telautograph window 55 fills in a paper form 56 (Figure 4) fed continuously from a roll 57 over a guide roller 58. At the same time, at the master station at headquarters the telautograph records the identical information on a paper form there located.

Also connected in series with the normally open contacts 27¹ across the line is the power supply 60 of signal oscillator 61 and original locking oscillator 62 (Figure 7). Similarly connected in series with normally open contacts 27¹ and in another parallel branch is a ready signal 63 (such as a lamp or buzzer) in series with normally open contacts 65¹ of locking signal transmitting relay 65 (Figure 7). Cycle starting relay 27 includes normally closed contacts 27⁴ and normally open contacts 27⁵ (Figure 7) and when the relay picks up contacts 27⁴ open and contacts 27⁵ close passing energy from generator 47 and power leads 50 and 51 through normally closed contacts 70¹ of locking shift relay 70, through normally open contacts 27⁵ in closed position, through normally closed contacts 43² of lock-out receiving relay 43 and then through locking signal transmitting relay 65 to the opposite side of the source. Closing of normally open contacts 65¹ by locking signal transmitting relay 65 operates ready signal 63, which is suitably an electric light.

Also in parallel with the other branches and in series with normally open contacts 27¹ across the line is telephone 72 (Figure 6) on which the user can call up the operator in the master station for instructions. The telephone may be an ear phone and coin box device. In a separate parallel branch is push button 73 and instruction record player 74 (Figures 1, 3 and 6).

In a separate parallel branch across the line in series with normally open contacts 27¹ is normally closed paper limit switch 75 which is held open by the policy passing through the telautograph machine at this stage so that paper knife solenoid 76 (whose armature carries the spring return paper knife 76¹) in series therewith which operates the paper knife is not energized at this stage of the operation.

In series with normally open contacts 27¹ of cycle starting relay 27 and in series with paper limit switch 75 and in parallel with paper knife solenoid 76 across the line are normally closed contacts 78¹ of dispensing station release control relay 78, and also relay 78 itself. Normally open contacts 78² of dispensing station release control relay 78 are in series with normally open contacts 27¹ of cycle starting relay 27 and relay 78.

A second normally closed paper limit switch 81 is in a branch in series with door closing relay 82 and in parallel with dispensing station release control relay 78, but in series with normally open contacts 78² of relay 78 and normally open contacts 27¹ of cycle starting relay 27.

When door lock solenoid 32 is energized the door is unlocked. Door closing limit switch 83 is in contact with contact 97 of the single pole double throw switch until the door opening motor 88 has partially opened the door. Then the door closing limit switch 83 is in contact with contact 84 of the single pole double throw switch. In this position although an interruption of electric power to terminals 29 and 30 would allow contact 27¹ to open, the dispenser could operate as soon as electric power was restored without the use of a second check. The normally open contacts 27¹ of cycle starting relay 27 are in series with and complete the circuit from line terminal 29 to the opposite side of the line in series through normally closed door opening limit switch 85, normally closed contacts 82¹ of door closing relay 2 and door opening motor winding 87 (which is desirably one winding of door motor 88, Figures 2 and 3). The door motor 88 drives through its speed reduction to a pinion 89 which meshes with a gear 90 which meshes with pinion 91 on one end of a door cross shaft 92 which extends across the machine and carries a pinion 93 at the opposite end. Pinion 93 intergears with a gear 90' at the opposite end of the machine. Door segments 94 fastened to gears 90 and 90' move with the gears at the opposite ends to open and close the door. The door continues to open until it is completely open when it contacts door opening limit switch 85, opening the circuit of door opening motor winding 87 and stopping the motor.

When the policy or other contract is completely filled in, the user places the pen or stylus 52 in the holder at the dispensing station and the operator at the master station causes the contract to be fed out of the telautograph as later explained. Almost at the end of the policy advance an opening in the policy permits paper limit switch 75 to close, energizing the paper knife solenoid 76 which cuts off the completed policy. This also applies energy through normally closed contacts 78¹ of dispensing station release control relay 78, energizing the relay and closing normally open holding contacts 78² which hold the relay energized. In its final advance, the policy opens paper limit switch 75. Since the contract forms are of uniform length, paper limit switch 75 can be at any point along the form at the telautograph and is not influenced by the action of the paper knife.

As the completed form is stepped up or fed out of the telautograph it opens paper limit switch 81, which opens before paper limit switch 75 closes (Figure 8).

The customer completes the operation of the dispensing unit as shown in Figure 6 by removing the filled out policy which allows paper limit switch 81 to close. When paper limit switch 81 closes, this energizes door closing relay 82 through normally open contacts 27¹ of cycle starting relay 27, normally open contacts 78² of dispensing station release control relay 78 and paper limit switch 81. Door closing relay 82 closes normally open contact 82² and energizes door closing motor 96 (preferably a separate winding of door motor 88) which turns the door motor in the direction to close the door. The door motor stops when the door is completely closed, at which time door limit switch 83 is shifted by the door into position in electrical connection with contact 97, breaking contact 84. At the time that door closing motor 96 is operated to close the door through normally open contacts 95, door opening motor 87 is deenergized because normally closed contacts 82¹ of door closing relay 82 are now open and door opening motor 87 is not energized even after the door opens enough to allow door opening limit switch 85 to close.

When door closing limit switch 83 is shifted to the position to make contact 97, release relay 26 is energized by current flowing through normally open contacts 78³ of dispensing station control relay 78 which are then closed by energization of relay 78. The energizing of release relay 26 breaks normally closed contacts 26' of release relay 26, deenergizing cycle starting relay 27 which deenergizes all the relays and power supplies except the source 28, 30. Latching solenoid 32 resets and holds the door closed until a new user inserts a coin to operate the dispensing station device. The door motor is deliberately made slow and weak enough so that no danger of personal injury to the user arises from the device.

The circuit for operation of the telautograph and the telephone at the dispensing station is shown in Figure 7. The circuit of Figure 7 allows a single pair of telephone wires to carry a telephone conversation plus the telautograph signals between the dispensing station and the master station. The circuit includes what is known in the telephone and telegraph industries as a composite set 100, which has telephone terminals 101, telegraph terminals 102 and an outgoing line 103. This allows each side of the telephone pair of lines to be used for separate telegraph circuits as well as for simultaneous telephone use. Any well known composite set may be used, for example that described in Standard Handbook for Electrical Engineers (7th edition, McGraw-Hill Book Co.), page 2065, or other similar publication. The telautograph station 48 may be of any well known type, for example that described in U. S. Patent No. 1,623,220 above referred to. It has a lefthand writing terminal 104, a righthand writing terminal 105, a signal terminal 106, a locking terminal 107, a positive power connection 51 and a negative power connection 50. Direct current power is supplied in any suitable manner, as from the local generator or rectifier 47 at each station, provided each station is properly grounded.

In the present instance the negative side is grounded at 108. The lefthand and righthand writing terminals 104 and 105 are connected by connections 110 and 111 to the telegraph terminals of the composite set. The outgoing pair of wires 103 interconnect the dispensing station with the master station to be described, and where there are several dispensing stations there are several pairs of wires 103 going out to them as later described. There is but one pair of lines for each dispensing station. The signal terminal and locking terminal voltages are transmitted through the telephone system by carrier currents as explained below.

The telephone 72 is energized as explained above in connection with Figure 6. The telephone on the communication side is connected by lines 114 through filter 115 to the telephone terminals 101 of the composite set. The telephone 72 in Figure 7 may be a standard unit with coin box which accepts nickels, dimes and quarters. As shown in Figure 9, filter 115 passes on low frequency up to a definite cut-off frequency of the filter. To any frequency higher than the cut off frequency filter 115 acts like an open circuit. As well known in telephone practice, filter 115 has cut-off frequency high enough to allow understandable voice transmission, cutting off only frequency not necessary to understand the voice. At the master station of Figure 11, a similar filter 115 removes any carrier current frequency beyond the cut-off frequency and permits the frequency used in telephoning to pass through the telephone 72 without interference.

A voltage at the signal terminal 106 of the telautograph passes through signal line 116 to one of the normally open contacts 120¹ and also to one of the normally closed contacts 120² of signal receiving relay 120. From the opposite side of the normally closed contacts 120², line 121 connects with one input terminal of signal oscillator 61, the other input terminal being connected by line 122 with the negative side 50 of the source.

The output terminals of signal oscillator 61 connect by connections 123 with signal filter 124 which on the other side is connected by connections 125 with the telephone terminals 101 of the composite set in parallel with the connections from telephone filter 115.

Signal oscillator 61 thus is caused to generate a frequency $f_1$, which is slightly higher than the cut-off frequency of telephone filter 115. Signal filter 124 passes only this signal frequency to the composite set and thence to the master station. In the master station a similar signal filter 124 passes this signal frequency and allows signal receiving relay 120 to be energized, since it is connected to signal filter 124 by connections 126 and 127 passing through normally open contacts 43³ of lock-out receiving relay 43. Relay 43 is energized as described later, causing contacts 43³ to be closed. When the signal receiving relay 120 (in the master station, Figure 11) is energized, it closes normally open contacts 117 of relay 120 and connects signal line 116 from signal terminal 106 to the positive side of the source 51 by lead 130.

When a coin is deposited in the coin slot and cycle starting relay 27 is energized, normally closed contacts 27⁴ open and normally open contacts 27⁵ close, connecting the positive side 51 of the source through normally closed contacts 70¹ of locking shift relay 70, through normally open contacts 27⁵ (in closed position) of cycle starting relay 27, to one of the normally open contacts 43⁴ and to one of the normally closed contacts 43², both of lock-out relay 43 (Figure 7). The opposite side of normally closed contact 43² connects through lead 132 with one of the normally open contacts 65² of locking signal transmitting relay 65 and also through locking signal transmitting relay 65 and lead 134 to the negative side of the source. A branch lead 135 from lead 134 connects to the input of original locking oscillator 62. When the normally open contacts 65² of locking signal transmitting relay 65 are closed by energizing relay 65, the normally open contact 65² is connected by lead 136 to the opposite side of original locking oscillator 62. As soon as cycle starting relay 27 is energized, locking signal transmitting relay 65 is therefore energized, applying energy to the input of original locking oscillator 62. The output of original locking oscillator 62 is connected by leads 137 with locking filter 138 which is connected to telephone terminals 101 of the composite set, in parallel with the telephone filter and the signal filter. The frequency $f_2$ of locking filter 138 is slightly higher than the frequency $f_1$ of signal filter 124 as shown in Figure 9, but is still well within the minimum frequency capabilities of modern telephone practice. This locking filter 138 corresponds in frequency to original locking oscillator 62 and passes only frequency $f_2$, while signal filter 124 corresponds in frequency with signal oscillator 61 and passes only frequency $f_1$. At the master station frequency $f_2$ passes through locking filter 138 (Figure 11) and operates lock-out receiving relay 43 to apply voltage from the source to the locking terminal 107 of the master station telautograph.

When the customer starts to write by picking up the pen, energy is applied to the locking terminal 107 in the dispensing station telautograph, energizing locking line 140. This causes current to flow through normally closed contacts 70² of locking shift relay 70, energizing relay 70 and closing normally open contacts 70³ of the same relay. Normally open contacts 70³ when closed hold locking shift relay 70 in operation. When locking shift relay 70 picks up, normally open contacts 70⁴ of locking shift relay 70 close, connecting locking terminal 107 and locking line 140 through normally closed contacts 43² and normally open contacts 65² (in closed position) with the input of original locking oscillator 62 at the dispensing station. At the same time, the locking action previously applied through normally closed contacts 70¹ of locking shift relay 70 ceases and the locking impulse sent out through locking filter 138 depends upon the use of the pen by the user and ceases when the user puts the pen down as well known in telautograph practice. Therefore, when the user puts the pen down, the dispensing station can receive telautograph impulses from the master station which will produce writing on the policy or other contract at the dispensing station.

Locking signal transmitting relay 65 has a set of normally closed contacts 65³ which are in circuit with lockout receiving relay 43 across the input side of locking filter 138, to keep lock-out receiving relay 43 from operating as long as the pen at the dispensing station in use.

At the master station shown in Figure 11, the composite set, telautograph filters 124 and 138, telephone filter 115, oscillators 61 and 62 and relays 43, 65 and 120 are connected in the same way as at the dispensing station, as shown in Figure 7, except that normally open contacts 27⁵, and normally closed contacts 27⁴ of cycle starting relay 27 are omitted, and locking shift relay 70 and its contacts 70¹, 70², 70³ and 70⁴ are omitted, and contact 43⁵ of lock-out relay is added. The differences in the circuit of Figure 11 (taken with Figure 10) from Figure 7 will now be described.

The telephone 72 in Figure 11 will desirably be the same as that used by long distance telephone operators, so that the master station operator can collect the price of the policy before signing or validating the policy.

After a customer has deposited a coin in the coin slot of a particular dispensing station, which for convenience will be described as station "X," a locking signal is produced at this station as already described. This locking signal passes through contacts X171 and X172 in righthand position as shown, thence to lines 153, thence through contacts 173 and 174 of any dispensing stations similar to X and Y and thence through Y173 and Y174, and thence through X173 and X174 to terminals 103 of the composite set and thence through the composite set and through locking filter 138 of the master station, energizing lock-out receiving relay 43 at the master station. The energizing of lock-out receiving relay 43 closes normally open contacts 43⁶ on this relay, applying energy through system lock-out relay 146 and normally closed reset switch 147. When system lock-out relay 146 picks up it closes normally open contacts 146¹ which hold system lock-out relay 146 closed, and applies energy from power terminals 50 and 51 to input leads 151 of system locking oscillator 152. System locking oscillator 152 sends out a strong locking signal at locking frequency $f_2$ to the entire system through locking lines 153. The distribution of this locking carrier wave to the system is described below in connection with a description of the switching.

Considering now Figure 10, system lock-out relay 146 also is provided with normally open contacts 146² in series across the line with normally closed contacts X157¹ and Y157¹ respectively of line switching relays X157 (for station X) and Y157 (for station Y), and also with auxiliary filter control relay 158. Auxiliary filter control relay 158 closes normally open contacts 158¹ which hold the relay closed notwithstanding the opening of contacts 146² of system lock-out relay 146. Auxiliary filter control relay 158 (Figure 10) has normally closed contacts X158² and Y158² (Figure 11) in the lines 103 of the respective stations, which disconnect the lines of any dispensing station from the master station when auxiliary filter control relay 158 is energized. An auxiliary filter 162 is interposed across the line 103 of each station in series with normally open contacts X158³, Y158³, etc. of auxiliary filter control relay 158. Auxiliary locking filter 162 is of the same character and passes the same frequency range $f_2$ as locking filter 138. The auxiliary filter control relay 158 isolates each station from signal feed back from any other station. On the output side of each auxiliary locking filter 162 is an auxiliary filter locking signal relay X164, Y164, etc. The dispensing station sending the locking signal causes the appropriate relay, in this case X164, to pick up.

Auxiliary filter locking signal relay X164, in common with the other similar relays in the other lines, has a normally open contact X164¹ (Figure 10) in series with line switching relay X157 and with a normally open contact 146³ of system lock-out relay 146. Line switching relay X157 has normally open contacts X157² which shunt contacts X164¹ and hold the relay closed. An exactly similar construction is provided for line switching relay Y157 and any other similar relays for the individual dispensing stations. A series of signal lights individual to the different line switching relays 157 designated as X168 and Y168 are energized by normally open contacts X157³ and Y157³ on line switching relays X157 and Y157 respectively. Each of the line switching relays 157 has a contact X157¹, Y157¹, etc. which is in series with auxiliary filter control relay 158 and is normally closed and does not open until all other contacts of the line switching relay 157 close when the relay is energized, as well known in the art. The opening of contacts X157¹ or Y157¹ deenergizes auxiliary filter control relay 158 and the deenergization of auxiliary filter control relay 158 closes the various normally closed contacts 158² and connects the lines from all dispensing stations to the main bus of the master station. The line switching relay 157 for each dispensing station carries a series of single pole double throw switches respectively designated as X171, X172, X173, X174 for relay X157, Y171, Y172, Y173, Y174 for relay Y157, etc. (Figure 11). When the particular line switching relay, say X157, is energized these switches are thrown to the lefthand position of Figure 11, connecting the particular dispensing station whose relay 157 is energized with the incoming terminals of the composite set of the master unit. All other dispensing stations whose relays are not energized remain disconnected from the master station composite set and are connected to locking signals from system locking oscillator 152, which transmits at the same frequency as original locking oscillator 62.

The telautograph system now permits the policy to be filled out by the customer, or by the operator at the master station or by both of them, only one writing at one time, and neither station able to break in until the other has finished.

When the policy has been completely filled out and executed, the operator at the master station pushes release policy switch button 175, which connects release relay 176 across the line through contacts 43⁵ of lock-out relay 43 (Figure 11) (when the pen at the dispensing station is returned to its holder) and also connects forward step relay 177 in series with normally closed contacts 180¹ of reset step relay 180 across the line (Figure 10). Forward step relay 177 has a normally open contact 177¹ (Figure 11) which when closed connects the paper advance terminals of the telautograph (as well known in the art), advancing the contract forms at both the master and the active dispensing station one step. When the form advances paper limit switch 182 (Figure 10) at the master station is closed by the form, thus holding release relay 176 and forward step relay 177 closed notwithstanding opening of the policy release switch 175, by current flowing through normally closed paper stop switch 183, paper limit switch 182 and normally open contacts 176¹ (in closed position) of release relay 176.

In a separate branch of the circuit parallel with release relay 176 and in series with paper limit switch 182, paper stop switch 183 and normally open contacts 176¹ is reset step relay 180 in series with normally open contacts 177² of forward step relay 177. As soon as reset step relay 180 is energized it opens normally closed contacts 180¹ and deenergizes forward step relay 177. When forward step relay 177 is deenergized it opens paper advance contacts 181, resetting the policy advance mechanism of the telautograph (Figure 11) and deenergizes back step relay 180. When back step relay 180 deenergizes, forward step relay 177 is again energized. This step-by-step alternate energization and deenergization of step relays 177 and 180 continues until paper limit switch 182 is opened due to an opening at the end of the contract form. This stops the advance of the policies at both stations.

After the customer has removed his policy and the switch 81 has closed at station X, the operator at the master station pushes reset button 147 which unlocks the entire system by deenergizing system lock-out relay 146, opening contacts 148 and deenergizing system locking oscillator 152. Also contacts 146³ open, deenergizing line switching relay X157. A user at station Y or any other station can then proceed to operate the device.

*Operation*

In operation it will be understood that the customer passing by the machine hears the contract advertised by electrical phonograph 41 operating under control of timer 42 with suitable automatic record changers as desired. This adverising device remains in operation until normally closed contact 27³ (Figure 6) of cycle starting relay 27 opens as later explained.

When the customer desires to operate the machine he inserts a coin in coin slot 21, closing check controlled switch 20 momentarily. The coin, assuming it passes the slug rejector, enters coin box 23 unless the system is busy. If the system is busy, the locking signal from system locking oscillator 152 and passing through switches 171, 172 in the lefthand position of Figure 11 goes through composite set 100 (Figure 7), and locking filter 138 and energizes lock-out receiving relay 43, closing normally open contacts 43¹ (Figure 6) which operates busy signal 46 and also energizes coin lock-out solenoid 45, causing the coin to be rejected into coin return slot 24.

Assuming that the customer has found the system free, or has waited until the busy signal has ceased, the closing of the check controlled switch 20 in the absence of the busy condition energizes cycle starting relay 27. This closes normally open contacts 27¹ (and at the same time opens normally closed contacts 27³ to prevent operation of the busy signal). Latching solenoid 32 is energized and releases the door, energy is applied to the generator for the telautograph and to the power supply 60 (Figure 6) for the oscillators 61 and 62 (Figure 7) the ready signal 63 (Figure 6) is operated, telephone 72 is placed in operation and instruction record player 74 is rendered available for operation by pressing push button 73.

Paper limit switch 75 is open (Figures 6 and 8) and prevents operation of the paper knife solenoid at this time. Door opening motor winding 87 of door opening motor 88 is energized, and the door is motor driven to opening position until door opening limit switch 85 is opened by the door and disconnects the opening motor.

When cycle starting relay 27 closes, a preliminary locking signal is sent out as follows by the circuit of Figure 7.

Normally closed contacts 27⁴ of cycle starting relay 27 open and normally open contacts 27⁵ of the same relay close, transmitting a locking signal from power terminal 51 of the telautograph of the particular operating dispensing station through normally closed contacts 70¹ of locking shift relay 70 in closed position, through the closed normally open contacts 27⁵ of cycle starting relay 27, through normally closed contacts 43² of lock-out receiving relay 43 and then through locking signal transmitting relay 65 and lead 134 to the opposite side of the power source. Locking signal transmitting relay 65 then picks up, opening normally closed contacts 65³ in the circuit of lock-out receiving relay 43 and thus preventing relay 43 from being energized. Lock-out receiving relay 43 is energized only when the particular station is locked out. Normally open contacts 65² of lock-out transmitting relay 65 close and connect to the positive side of the source through normally closed contacts 43² of lock-out receiving relay 43 in closed position, normally open contacts 27⁵ (in closed position) of cycle starting relay 27 and normally closed contacts 70¹ of locking shift relay 70, and to the input side of the original locking oscillator 62, thus energizing the locking oscillator. The opposite side of the input of locking oscillator 62 is connected to the negative side of the source. Signal relay 120 cannot be energized as normally open contacts 43³ in its relay circuit are open.

Original locking oscillator 62 sends out a locking carrier wave through locking filter 138 to the telephone terminals 101 of composite set 100 and thence to outgoing line 103 to the master station.

Referring now to Figure 11, at the master station the locking carrier wave passes through normally closed contacts X158² (it being assumed that station X is operating) and switches X171 and X172 in their righthand position, then along the bus bars through switches Y173, Y174 and X173, X174 in their righthand position to composite set 100. From the composite set the locking carrier wave passes through locking filter 138 and causes lock-out receiving relay 43 to be energized. Normally open contacts 43⁶ of lock-out receiving relay 43 are closed, energizing system lock-out relay 146, and normally open contacts 146¹ of system lock-out relay 146 close and hold the system lock-out relay closed, and energize system locking oscillator 152 at the master station. This system locking oscillator sends out a strong locking carrier wave through lines 153 and switches Y171, Y172 in the righthand position to station Y, and to each other similar locked out station. At station Y and at each similar station as seen in Figure 7, this locking carrier wave passes through composite set 100, filter 138 and causes lock-out receiving relay 43 to be energized.

The energizing of lock-out receiving relay 43 opens normally closed contacts 43¹, and thereby opens the circuit of locking signal transmitting relay 65 so that original locking oscillator 62 cannot be energized. At the same time signal oscillator 61 remains inoperative because its signal terminal 106 has no energy.

As seen in Figure 10, normally open contacts 146² of system lock-out relay 146 are in series through normally closed contacts X157¹ and Y157¹ with auxiliary filter control relay 158, and relay 158 is therefore energized, closing its normally open contacts 158¹ which shunt normally open contacts 146² and hold auxiliary filter control relay 158 in operation. Relay 158 has normally closed contacts X158², Y158² in the line of each station (see Figure 11). These normally closed contacts X158², Y158² open. Normally open contacts X158³, Y158³ for each station close when auxiliary filter control relay 158 is energized and connect auxiliary locking filters 162 (which respond to the same frequency as locking filters 138) to each pair of incoming lines and at the same time isolate each station from signal feed back from any other station. The station which is sending out its locking signal causes the appropriate auxiliary locking filter to pass energy which causes the corresponding auxiliary filter locking signal relay X164 to be energized, closing normally open contacts X164¹ in series with a line switching relay X157 and in series with normally open contacts 146³ (now closed) of system lock-out relay 146.

Line switching relay X157 closes normally open contacts X157² which shunt normally open contacts X164¹ and hold line switching relay X157 energized. Normally closed contacts X157¹ of line switching relay X157, which cannot open until normally open contacts X157² close, de-energize auxiliary filter control relay 158, which allows contacts X158² to close (Figure 11). Relay X157 when it energizes moves switches X171, X172, X173 and X174 to the lefthand position, thus connecting lines 103 from station X to the composite set of the master station and at the same time leaving the lines from all the other stations connected to the locking signal being generated by system locking oscillator 152.

A customer, for example, at station X, will normally press the push button 73 (Figure 6) and listen to the instruction record player 74, or in some cases talk on the telephone 72 with the master station. When adequately instructed, the customer will take hold of the special pencil or stylus 52 (Figure 2) and write on the steel pad or plate 53 filling in the information required for the insurance policy or other contract.

This energizes locking terminal 107 of telautograph dispensing station X as well known in the art, and the energizing of locking terminal 107 causes current to pass through normally closed contacts 70² of locking shift relay 70 (Figure 7), which makes locking shift relay 70 pick up. When locking shift relay 70 picks up it closes normally open contacts 70³ of relay 70, causing relay 70 to remain energized. When locking shift relay 70 picks up it also closes normally open contacts 70⁴, which transmits the locking signal from locking line 140 through normally closed contacts 43², lead 132 and locking signal transmitting relay 65, causing locking signal transmitting relay 65 to remain energized and thus continuing to transmit the locking signal to the master station as long as the pen is being used. When, however, the pen is put down, the master station can take over the function of writing, and can write on the policy (make necessary signatures), which is filled out in duplicate originals at the master station and at the dispensing station. It is not possible, however, for both the dispensing station and the master station to write at the same time. The picking up of locking shift relay 70 opens normally closed contacts 70² and thus discontinues the continuous locking signal previously transmitted from positive power terminal 51 of the telautograph and makes the locking signal dependent upon the use of the pen, continuing while the pen is in use and ceasing when the pen is not in use.

The energizing of lock-out receiving relay 43 (Figure 11) at the master station closes normally open contacts 43³ of this relay and completes the circuit of signal relay 120 connected to filter 124. Likewise the energizing of lock-out receiving relay 43 opens normally closed contacts $43^2$ in the circuit of locking signal transmitting relay 65, thus preventing relay 65 from being energized and thus assuring that original locking oscillator 62 at the master station will not operate at the time that the user is writing at the dispensing station. When lock-out receiving relay 43 is energized, it closes its normally open contacts $43^4$, applying energy to the locking terminal 107. Thus in effect voltage has been applied by the carrier system to locking terminal 107 at the master station, while at the same time original locking oscillator 62 at the master station is rendered inoperative. When the telautograph at the dispensing station is energized it applies signal voltage from signal terminal 106 to the input side of signal oscillator 61, which sends out a signal carrier wave through signal filter 124 and composite set 100 to the master station. The carrier wave at the master station passes through telephone terminals, passes through signal filter 124 and through signal relay 120 whose circuit has been closed by the energization of lock-out receiving relay 43. Energization of signal relay 120 now occurs, which opens normally closed contacts $120^2$ to signal oscillator 61 and closes its normally open contacts 117, applying voltage from the source at the master station (which is continuously connected to the master station) to signal terminal 106 by means of the operation of the carrier system.

In the meantime the writing signals are transmitted through telegraph terminals of the composite set at the dispensing station to the telegraph terminals of the composite set at the master station, thus filling in both duplicate originals of the insurance policy or other contract.

At any time during operation of the telautograph, the customer may desire information which is not included in the instructions. He can then use the telephone to communicate with the operator at the master station, the telephone current passing through telephone filter 115 without interfering in any way with the telautograph. At the receiving station, a similar telephone filter 115 filters out all telautograph carrier waves and passes the telephone current to the telephone 72.

At any time the user may communicate information by telephone to the master station and when the user lays down the pen at the dispensing station, the operator at the master station can continue to fill out and sign the policy. In this case the dispensing station ceases to send out a locking signal as soon as the user lays down his pen, although all other stations remain locked out due to the operation of system lock-out oscillator 152. As soon as the operator at the master station takes up the pen, a locking signal is transmitted from locking terminal 107 to the dispensing station by reason of the energization of locking signal transmitting relay 65 which puts original locking oscillator 62 in operation. From then on until the operator at the master station lays down his pen, the master station acts as the sending station and the dispensing station acts as the receiving station in exactly the reverse relationship to that previously described.

At the end of the filling out of the policy, assuming the policy has been paid for by the coins deposited in the telephone coin box, the insurance company operator at the master station signs the policy, thus completing it. If the policy is not to go into effect until a check or the like is received, this operation can be deferred until the user sends in his check. A blank check can, if desired, be included in the policy form. Thus the purchaser can complete and sign or the purchaser can sign a check prepared and returned to the master station. The insurance company representative can write on the policy to indicate that the policy will not go into effect until the check has been honored and the premium is received. Likewise, if it is found that the customer is entitled to a refund of money deposited, this information can also be written on the policy by the insurance company operator (representative or agent). Thus the transaction can be completed in a few minutes and is very economical of time. When the policy has been completely filled in, and the customer has returned the pen to its holder to close normally closed contacts $145^1$, the operator at the master station pushes policy release switch 175 (Figure 10). This energizes relay 176 and forward step relay 177. Forward step relay 177 has a normally open contact $177^1$ (Figure 11) across the paper advance terminals of the telautograph which advance the forms at both stations by step motion as well known in the art. A second normally open contact $177^2$ of forward step relay 177 energizes reset step relay 180 and a normally closed contact $180^1$ of reset step relay 180 opens and deenergizes forward step relay 177. Thus step relays 177 and 180 energize alternately and successively cause the opening and closing of paper advance contacts 181 so that the paper at the dispensing station and at the master station feeds forward in successive steps.

As soon as the paper begins its advance, it closes paper limit switch 182, in series with normally open contacts $176^1$ of release relay 176, thus holding release relay 176 in operation notwithstanding that the policy release switch merely makes contact for a few moments.

At each time after the contacts of forward step relay 177 opens, the policy advance mechanism of the telautograph resets for the next forward step as well known. This cycle is repeated until the paper form causes paper limit switch 182 to open (Figure 12). This stops the advance of the contract forms at both stations. The operator at the master station can at any time stop the advance of the contract forms by opening the stop switch 183 to open the circuit of release relay 176 and step relay 177 or 180, whichever one is operating at the moment.

As the policy at the dispensing station is fed out of the machine, normally closed paper limit switch 81 opens (Figure 8), and then a notch or opening in the policy allows paper limit switch 75 to close. This energizes paper knife solenoid 76, cutting off the completed policy (Figure 6). This also energizes dispensing station control relay 78 which holds itself closed by normally open contacts $78^2$. The policy in its final advance from the machine opens paper limit switch 75.

When a customer pulls the completed form out of the machine, paper limit switch 81 (which was formerly open) is allowed to close. This energizes door closing relay 82 through paper limit switch 81 and contact $78^2$ of dispensing station control relay 78. Contacts $82^2$ of door closing relay 82 energize door closing motor 96, which causes the door to close. Normally closed contact $82^1$ of door closing relay 82 keeps the door opening motor 87 deenergized when the door closes enough to allow door opening limit switch 85 to close. When door closing limit switch 83 is operated by the closed door, release relay 26 is energized through closed contact 78³ of relay 78. Normally closed contacts 26¹ of release relay 26 open and deenergize cycle starting relay 27. This deenergizes all the relays and power supplies at the dispensing station except terminals 28, 30. The latch holds the door closed until a new coin is inserted.

After the customer has removed the policy and the door has been closed at station X, the operator at the central station pushes reset button 147. This deenergizes system lock-out relay 146 and normally open contacts 146¹ open, deenergizing system locking oscillator 152 which unlocks all the other stations. Normally open contacts 146³ (Figure 10) also open, deenergizing line switching relay X157. The system is then available for operation by insertion of a coin at any one of the dispensing stations. In case the coin is inserted at station Y, station Y operates exactly after the manner of station X already described, and station X and all other stations are locked out.

It will be evident that the machine operates in a very simple and effective manner to dispense a policy or contract at low cost.

While the invention may in many instances have its widest application in connection with the sale of insurance and the making of contracts, it will be understood that it is also applicable in other fields of activity. For example, it may be used by accountants in conducting the account of small businesses, the master station being placed at the accountant's office, and the individual dispensing stations being located in the offices of customers, at which points the transactions of the customers can be recorded for the guidance of the accountants.

The invention may similarly be used in any other business in which information capable of being written is to be transmitted to or from a master station by or to individual dispensing stations.

In view of my invention and disclosure variations and modifications to meet individual whim or particular need will doubtless become evident to others skilled in the art, to obtain all or part of the benefits of my invention without copying the structure and process shown, and I, therefore, claim all such insofar as they fall within the reasonable spirit and scope of my claims.

Having thus described my invention, what I claim as new and desire to secure by Letters Patent is:

1. In a contract vending machine, a telautograph having a paper feed, a check controlled switch, a source of current, a movable door on the machine, a door opening and a door closing motor operatively connected to the door, a cycle starting relay in circuit with the check controlled switch across the source and having contacts in circuit with the door opening motor across the source, a door opening limit switch in circuit with the door opening motor and operatively connected to be opened by the door in open position of the door, a paper limit switch opened by the paper and means in circuit with the paper limit switch for starting the door closing motor, stopping the door closing motor and deenergizing the cycle starting relay.

2. In a contract vending machine, a telautograph having a paper feed, a check controlled switch, a source of current, a movable door on the machine, a door opening and a door closing motor operatively connected to the door, a cycle starting relay in circuit with the check controlled switch across the source and having contacts in circuit with the door opening motor across the source, a door opening limit switch in circuit with the door opening motor and operatively connected to be opened by the door in open position of the door, first and second paper limit switches operatively connected to the paper so that the first paper limit switch is first opened by the paper, the second paper limit switch is next closed by the paper, the second paper limit switch is next opened by the paper and the first paper limit switch is next closed by the paper, a release control relay, a release relay, a door closing relay and a door closing limit switch, the release control relay being in circuit with the second paper limit switch and with contacts on the cycle starting relay across the source and having holding contacts and contacts in circuit with the release relay across the source and also contacts in circuit with the door closing relay across the source, the first paper limit switch being in circuit with the door closing relay across the source, the door closing relay having contacts in circuit with the door closing motor and the door closing limit switch across the source, and also having contacts in circuit with the door opening motor, the door closing limit switch in the closed door position being in circuit with the release relay and the contacts on the release control relay across the source, and the release relay having contacts in circuit with the cycle starting relay across the source.

3. In a contract vending machine, a telautograph having a paper feed, a movable door on the machine, check controlled electrical means for opening the door and paper controlled electrical means for closing the door.

4. In a contract vending machine, a telautograph having a paper feed, a movable door on the machine, a solenoid lock on the door, check controlled electrical means for energizing the solenoid lock and unlocking the door, check controlled electrical means for opening the door, and paper controlled electrical means for closing the door and releasing the solenoid lock.

5. In a contract vending machine, a telautograph having a paper feed, a check controlled switch, a source of current, a movable door on the machine, a door opening and a door closing motor operatively connected to the door, a solenoid lock, a cycle starting relay in circuit with the check controlled switch across the source and having contacts in circuit with the solenoid lock across the source and with the door opening motor across the source, a door opening limit switch in circuit with the door opening motor and operatively connected to be opened by the door in open position of the door, first and second paper limit switches operatively connected to the paper so that the first paper limit switch is first opened by the paper, the second paper limit switch is next closed by the paper, the second paper limit switch is next opened by the paper, and the first paper limit switch is next closed by the paper, a release control relay, a release relay and a door closing relay, the release control relay being in circuit with the second paper limit switch and with contacts on the cycle starting relay across the source and having holding contacts and contacts in circuit with the release relay across the source and also contacts in circuit with the door closing relay across the source, the first paper limit switch being in circuit with the door closing relay across the source and the door closing relay having contacts in circuit with the door closing motor and the door closing limit switch across the source, and also having contacts in circuit with the door opening motor, the door closing limit switch in the closed door position being in circuit with the release relay and contacts on the release control relay across the source and the release relay having contacts in circuit with the starting relay across the source.

6. In a contract sales machine, a plurality of interconnected telautograph stations including paper advance contacts at a master station, a paper release switch at the master station, a source of current, a paper release relay in series with the paper release switch across the source and having paper step contacts closed when the relay is energized, a paper limit switch and means for successively opening and closing the paper feed contacts in series with the paper limit switch and the paper step contacts across the source.

References Cited in the file of this patent

UNITED STATES PATENTS

| Number | Name | Date |
| --- | --- | --- |
| 1,623,220 | Van Nostrand | Apr. 15, 1927 |
| 1,970,455 | Humphries | Aug. 14, 1934 |
| 2,186,252 | Little | Jan. 9, 1940 |
| 2,273,018 | Burcky | Feb. 17, 1942 |
| 2,276,991 | Long et al. | Mar. 17, 1942 |
| 2,346,238 | Schmidt et al. | Apr. 11, 1944 |
| 2,347,481 | Hooven | Apr. 25, 1944 |
| 2,455,724 | Bacon | Dec. 7, 1948 |